UNITED STATES PATENT OFFICE.

CARL HOEPFNER, OF FRANKFORT-ON-THE-MAIN, GERMANY; HENRY ORTH, JR., ADMINISTRATOR OF SAID HOEPFNER, DECEASED.

LEACHING AND EXTRACTION OF METALS FROM THEIR ORES.

SPECIFICATION forming part of Letters Patent No. 704,639, dated July 15, 1902.

Application filed September 27, 1899. Serial No. 731,852. (No specimens.)

*To all whom it may concern:*

Be it known that I, CARL HOEPFNER, a subject of the Emperor of Germany, residing at Frankfort-on-the-Main, Germany, have invented certain new and useful Improvements in the Leaching and Extraction of Metals from Their Ores; and I do hereby declare the following to be a full, clear, and exact description of the invention, such as will enable others skilled in the art to which it appertains to make and use the same.

This invention relates to extraction of metals from their ores, mattes, or other materials, and is designed to be especially used for the extraction of copper, lead, and silver from complex argentiferous or cupriferous sulfids or ores by means of cupric chlorid and to overcome many difficulties arising in the practical operation of the process described in Letters Patent granted to me October 24, 1893, and numbered 507,130, wherein I use a cupric-chlorid solution saturated with chlorid of alkali or alkaline earths for leaching sulfur ores of copper, silver, lead, zinc, &c., whereby these metals are converted into their respective chlorids, the cupric chlorid is converted into cuprous chlorid, and such metallic impurities, as cobalt, antimony, bismuth, arsenic, iron, &c., as are very often found in such ores are eliminated by precipitation to obtain a practically pure chlorid or such containing only silver. This cuprous-chlorid solution is then electrolyzed in a suitable apparatus, wherein the copper cathodes and carbon anodes are in separate compartments separated by a suitable diaphragm, as described in the aforesaid patent. Throughout this description I mention "alkaline-metal chlorids" and use the term as embracing both the metals of the alkalies and of the alkaline earths. Many years' experience with this process has revealed certain drawbacks which, if obviated, greatly add to its commercial success, especially when low-grade ores are treated, and which drawbacks are, first, considerable loss of chlorids in the waste residues; second, difficulty in securing for the cathodes a solution sufficiently free from cupric chlorid, ($CuCl_2$,) which decreases the output and is liable to deteriorate the quality of the product; third, it requires too long a time to remove the iron from the solutions by the action of air thereon, which will require too many tanks under supervision and necessarily increase the space required for the plant; fourth, this implies also a loss of heat in the solutions when separated from the ores and renders the automatical continuous-counter-current system of heating and lixiviating useless; fifth, in such solutions the solubility of cupric chlorid is very limited, especially when iron, zinc, and other metals are present, so that the production of strong $Cu_2Cl_2$ solutions becomes difficult; sixth, solutions being often overconcentrated precipitate their contents on a slight fall of temperature, thereby producing sediments which greatly deteriorate the copper products and that cover the anodes, and thus often double the required voltage and at the same time produce free chlorin, which quickly destroys the diaphragms. Experience has shown that the peculiar nature of cuprous-chlorid solutions makes it very difficult, almost impossible, to obtain a homogeneous solid copper except in the absence of cupric chlorid and also of iron. Now to obviate these difficulties I refrain from using cupric-chlorid solutions saturated with chlorid of alkalies or alkaline earths; but I do use the latter in proportions of three-fourths to one-fourth saturating quantity. This gives me the benefit of the following result: First, cupric-chlorid solutions containing less than the saturation quantity of chlorid of alkali and alkaline-earth metals can be made more concentrated in cupric-chlorid; second, when heated to 60° to 100° or more Celsius they are very active solvents of copper, sulfid of copper, silver, and other associated metals with the formation of cuprous chlorid; third, that when hot are very good solvents for cuprous chlorid, lead chlorid, and silver chlorid, which are rendered partially insoluble by cooling, a very easy means of separating these salts; fourth, these precipitates after separation and purification can be used at the cathodes by being added to the cathode solution, thereby providing a very convenient supply for the said solution; fifth, the solid $Cu_2Cl_2$ precipitate when oxidized is a very efficient precipitant for iron; sixth, the mother-liquor containing more or less $CuCl_2$ can be used either for a second leaching or for use at the anodes, where its contents of cuprous chlorid can be completely converted into cupric chlorid; seventh, the residues contain obviously less chlorids; eighth, the leaching process requires smaller tanks and less time because very strong cupric-chlorid solutions can be used and not all of the cupric chlorid need be converted into cuprous chlorid; ninth, there is no longer trouble at the anodes and cathodes due to overconcentration of the solution; tenth, from solutions containing lead the lead is more completely precipitated when cooled. These advantages make it possible to save chlorids, heat, labor, and space, all of vital importance to the successful commercial operation of a leaching process, especially when low-grade ores are used.

When applied to complex ores containing zinc, copper, silver, lead, iron, and other associated metals, the process is preferably, but not necessarily, carried out in two or more steps. The ore is first leached with a sufficient quantity of a warm solution of cupric chlorid containing the stated amount of alkaline-metal chlorid in order to dissolve the lead and silver, but of course some iron will also be dissolved. The lead chlorid and some of the silver chlorid thus formed are precipitated by refrigeration and the cuprous chlorid (reduced from the cupric chlorid by the action of the liquor on the ores with the conversion of the lead and silver into chlorid) is reconverted into cupric chlorid by free chlorin obtained in any suitable manner but conveniently from the reduction of the lead chlorid previously precipitated or zinc chlorid obtained in a subsequent stage, or I may effect the conversion by using the solution as an anode electrolyte in a suitable apparatus. The troublesome iron is precipitated by oxychlorid of copper, ($Cu_2Cl_2O$,) hereinafter referred to. The remaining lead may be precipitated by zinc oxid and carbonic acid; but it is preferable to keep this as a separate solution for extracting the lead from ores. We have now a liquor free from lead chlorid and partially free from silver chlorid. This cupric-chlorid solution is returned to the ores hot (of a higher temperature than the first solution) in order to dissolve the copper with some zinc; but I preferably use a second solution stronger in cupric chlorid, containing the stated amount of solvent of cuprous chlorid. The copper can then be obtained from the solution electrolytically as well as the zinc; but preferably I convert some of the cuprous chlorid into oxychlorid of copper by blowing air or oxygen into the electrolyte—

$$Cu_2Cl_2 + O = Cu_2Cl_2O;$$

but this is also and most conveniently done by refrigerating the solution or only a part thereof to precipitate cuprous chlorid, which is then converted into oxychlorid, and this solid precipitate I use as a most efficient reagent for iron or to enrich solutions poor in copper, so as to make them suitable for electrolysis—

$$3Cu_2Cl_2O + 2FeCl_2 = 4CuCl_2 + Cu_2Cl_2 + Fe_2O_3.$$

Having thus described my invention, what I claim as new therein, and desire to secure by Letters Patent, is—

1. The process of treating ores and metallic compounds containing copper, which consists in leaching the same with a cupric-chlorid solution containing a solvent of cuprous chlorid in quantity less than is required for saturation, and electrolyzing the resulting cuprous-chlorid solution while mechanically separating the electrode solutions, thereby depositing metal at the cathode and converting the cuprous into cupric chlorid, substantially as described.

2. The process of treating ores and metallic compounds containing copper, which consists in leaching the same with a cupric-chlorid solution containing a solvent of cuprous chlorid in quantity less than is required for saturation, precipitating from the solution so obtained cuprous chlorid, and electrolyzing a solution of the latter at the cathodes and the mother-liquor at the anodes while mechanically separating the electrode solutions, thereby depositing copper at the cathode and converting the cuprous into cupric chlorid, substantially as described.

3. The process of treating ores and metallic compounds containing copper, silver and lead, which consists in leaching the same with a warm or hot cupric-chlorid solution containing a solvent of cuprous chlorid in quantity less than is required for saturation, precipitating lead and silver therefrom, recovering these metals, reconverting the cuprous into cupric chlorid and returning the latter for leaching similar materials, substantially as described.

4. The process of treating ores and metallic compounds containing copper and lead, which consists in leaching the same with a warm or hot cupric-chlorid solution containing a solvent of cuprous chlorid in quantity less than is required for saturation, precipitating lead chlorid by refrigeration, converting the cuprous into cupric chlorid by chlorin, and returning the solution hot for further leaching of similar materials, substantially as described.

5. The process of treating ores and metallic compounds containing copper and lead, which consists in leaching the same with a warm or hot cupric-chlorid solution containing a solvent of cuprous chlorid in quantity less than is required for saturation, precipitating the lead chlorid formed by refrigeration, reconverting the cuprous into cupric chlorid in the anode compartment of an electrolytic apparatus, and returning the solution hot for leaching similar materials, substantially as described.

6. The process of obtaining copper, which consists in leaching a suitable material with a hot cupric-chlorid solution containing a solvent of cuprous chlorid in quantity less than is required for saturation, electrolyzing the resulting cuprous-chlorid solution while mechanically separating the electrode solutions, whereby metallic copper is deposited and the cuprous chlorid converted into cupric chlorid, and returning the latter into the cycle of operations, substantially as described.

7. The process of obtaining copper and silver, which consists in leaching a suitable material with a hot cupric-chlorid solution containing a solvent of cuprous chlorid less than is required for saturation, partially precipitating the cuprous chlorid from the resulting solution by refrigeration, and electrolyzing the remainder of the solution to recover the silver and copper while mechanically separating the electrode solutions, substantially as described.

8. The process of obtaining copper, which consists in leaching a suitable material containing these metals and iron with a hot cupric-chlorid solution containing a solvent of cuprous chlorid in quantity less than is required for saturation, partially precipitating cuprous chlorid from the resulting solution, oxidizing the latter and using a sufficient quantity of the resulting product for precipitating iron from the solutions and recovering the copper from the remainder, and returning the resulting liquor into the cycle of operations, substantially as described.

9. In the extraction of copper and silver from their ores containing iron, the step which consists in precipitating cuprous chlorid from hot solutions thereof, oxidizing the precipitate by means of air or oxygen and returning sufficient of the resulting product to the cuprous-chlorid solution under treatment to precipitate iron that may be present, substantially as set forth.

10. The process of obtaining copper, which consists in leaching a suitable material with a hot cupric-chlorid solution containing a solvent of cuprous chlorid, partially precipitating the cuprous chlorid from the resulting solution by cooling and electrolyzing the remainder of the solution to recover copper while mechanically separating the electrode solutions, substantially as described.

11. In the extraction of copper, the step which consists in precipitating cuprous chlorid from hot solutions thereof by cooling, removing and dissolving the precipitate by a suitable solution, and recovering the copper from the resulting solution in the cathode-cell of a suitable apparatus also containing an anode-cell and suitable anode solution, substantially as described.

12. The process of treating ores and metallic compounds, which consists in leaching the same with a warm cupric-chlorid solution containing a solvent of cuprous chlorid in quantity less than is required for saturation, precipitating lead and part of the silver chlorid formed by refrigeration, reconverting the resulting solution into a cupric-chlorid solution, returning the same at a higher degree of temperature to the material treated, thereby dissolving copper, precipitating any excess of iron by an oxygen compound of copper, electrolyzing the solution to recover the copper and zinc, and returning the resulting electrolyte into the cycle of operations, substantially as described.

13. In the extraction of copper, the step which consists in precipitating cuprous chlorid from hot solutions thereof by refrigeration, oxidizing the resulting solution at the anodes, using a solution of the precipitate in the cathode-cell of a suitable apparatus and depositing the copper, substantially as described.

14. The process of extracting metals, which consists in leaching a suitable material containing copper, lead and silver, with a warm cupric-chlorid solution containing a solvent of cuprous chlorid in quantity less than is required for saturation thereby dissolving lead and silver chlorids, precipitating them, reconverting the solution into cupric chlorid, using the same for leaching fresh quantities of ore, leaching the residues with a similar hot solution more concentrated in cupric chlorid, thereby dissolving copper and recovering those metals therefrom, reconverting the resulting solution into cupric chlorid, and returning the latter into the cycle of operations, substantially as described.

In testimony that I claim the foregoing as my invention I have signed my name in presence of two subscribing witnesses.

CARL HOEPFNER.

Witnesses:
 THOS. H. YOUNG,
 B. W. SOMMERS.